(12) United States Patent
Denis et al.

(10) Patent No.: US 6,764,035 B2
(45) Date of Patent: Jul. 20, 2004

(54) BRUSH CUTTER

(76) Inventors: Gilles Denis, 2163 Grand Rang, St-Charles sur le Richelieu, Quebec (CA), J0H 2G0; Laurent Denis, 123 Du Marche, Roxton Falls, Quebec (CA), J0H 1E0

(*) Notice: Subject to any disclaimer, the term of this patent is extended or adjusted under 35 U.S.C. 154(b) by 0 days.

(21) Appl. No.: 10/159,045

(22) Filed: Jun. 3, 2002

(65) Prior Publication Data

US 2003/0222164 A1 Dec. 4, 2003

(51) Int. Cl.[7] ............................................. B02C 18/16
(52) U.S. Cl. ................................... 241/101.72; 241/294
(58) Field of Search ................................. 241/294, 295, 241/242, 101.762, 101.763, 101.72

(56) References Cited

U.S. PATENT DOCUMENTS

| | | | |
|---|---|---|---|
| 1,606,324 A | | 11/1926 | Short |
| 2,574,468 A | | 11/1951 | Denton |
| 4,257,566 A | * | 3/1981 | Lawrence .................... 241/221 |
| 4,785,860 A | | 11/1988 | Arasmith |
| 5,692,689 A | | 12/1997 | Shinn |
| 5,779,167 A | * | 7/1998 | Wagstaff ..................... 241/242 |
| 5,873,534 A | | 2/1999 | Shinn |

FOREIGN PATENT DOCUMENTS

| | | |
|---|---|---|
| DE | 1 237 833 | 3/1967 |
| GB | 772194 | 4/1957 |
| GB | 1043964 | 9/1966 |
| NE | 6516330 | 6/1967 |

* cited by examiner

*Primary Examiner*—Mark Rosenbaum

(57) ABSTRACT

A brush cutting head having a cylindrical, tubular, support base. A plurality of cutting tooth mounting blocks are fixedly mounted on the cylindrical outer surface of the base, the blocks extending transverse to the longitudinal axis of the base, each block having a front face and sides. A cutting tooth is provided for each mounting block, each cutting tooth made from a plate having a uniform thickness with an inner surface and an outer surface. Each tooth has a straight, relatively long, base section and a straight, relatively short, cutting section bent from one end of the base section toward the inner surface to form an obtuse angle between the inner surface of the base section and the inner surface of the cutting section. Each tooth is mounted on the block with the base section of the tooth adjacent the front face of the block and the base section extending outwardly from the base, and with the cutting section above the block and extending forwardly from the base section of the tooth.

26 Claims, 5 Drawing Sheets

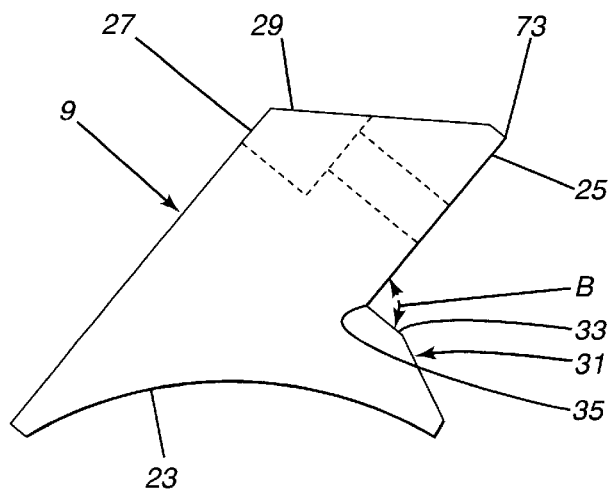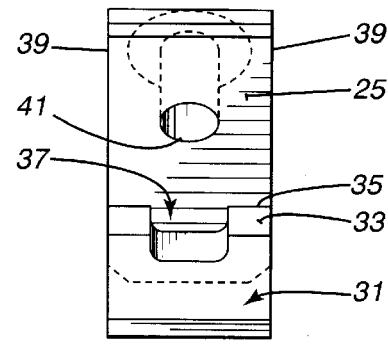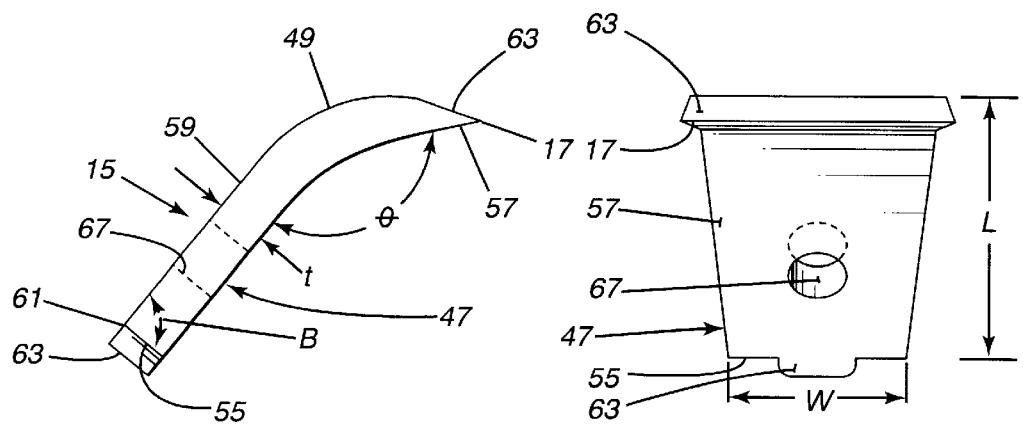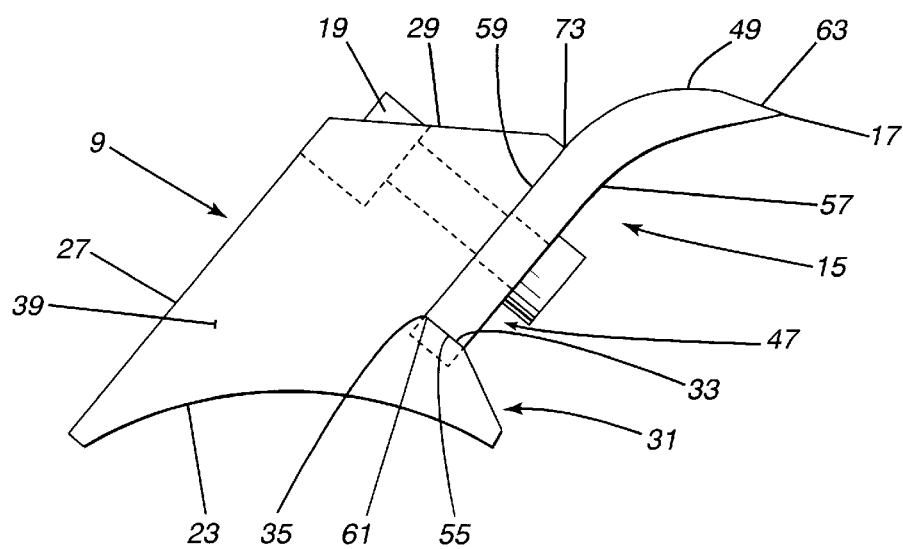

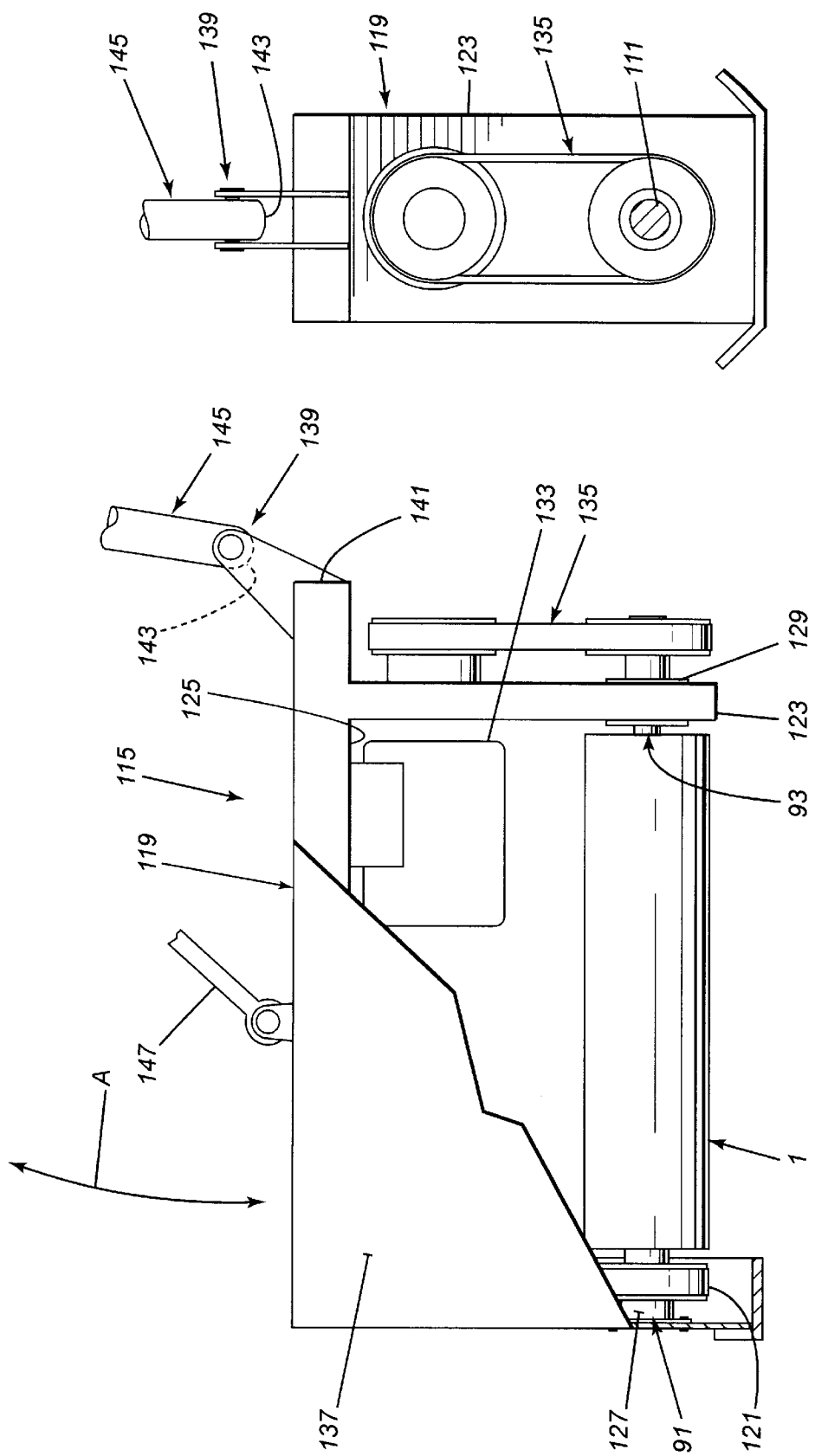

BRUSH CUTTER

BACKGROUND OF THE INVENTION

1. Field of the Invention

This invention is directed toward the cutting head used in a brush cutter and toward the cutting teeth employed on the cutting head. The invention is also directed toward a brush cutter employing the cutting head.

2. Description of the Related Art

Cutting heads used in brush cutters are known. However the known cutting heads have several disadvantages. One type of cutting head employs cutting teeth that are pivotally mounted, the teeth swinging radially outwardly as the cylindrical support head, carrying the teeth, and the mountings for the teeth, is rotated. Examples of such cutting heads are shown in U.S. Pat. Nos. 5,642,765 and 5,975,167. The pivot mountings for the cutting teeth are however easily damaged and replacement of the teeth, when damaged, can be difficult due to damage to the mountings.

Mounting blocks for the cutting teeth on cutting heads are also often fixedly mounted on the surface of the cylindrical support head in an exposed position. An example is shown in U.S. Pat. No. 5,873,534. These mounting blocks, and/or the teeth fixedly mounted on them, often hit rocks or large trees and are damaged or even broken off. Replacement of these mounting blocks is difficult and expensive.

The cutting teeth on brush cutters are often designed and mounted on the mounting blocks on the cutting head to cut in a tangential direction when the cylindrical support head is rotated. As a result, the mounting blocks are subject to high shear forces. The blocks must be quite large to resist these forces and this adds weight to the cutting head increasing power requirements. The teeth employed are also usually quite complicated in construction, as shown by the cutting teeth in the above patents, and are quite costly to replace when broken or damaged.

The cutting heads are normally mounted on a brush cutter vehicle to have the cylindrical support head, carrying the cutting teeth, rotate in a direction toward the vehicle. The chips and debris produced could damage the vehicle and injure the operator.

SUMMARY OF THE INVENTION

It is the purpose of the present invention to provide brush cutting heads which are stronger, less likely to damage, easier to service, and more efficient to operate, than known brush cutters.

It is also a purpose of the present invention to provide improved teeth for a brush cutting head which teeth are relatively simple and inexpensive to manufacture, easy to mount, and easy to replace. It is also the purpose of the present invention to provide a brush cutter with the brush cutting head mounted to minimize damage to the brush cutter.

In accordance with the present invention there is provided a brush cutting head having a cylindrical support base with cutting tooth mounting blocks fixedly mounted on the base. The blocks are preferably arranged in two diametrically opposed lines on the base with the blocks in each row spaced apart and the blocks in one row alternating with the blocks in the other row in a direction parallel to the longitudinal axis of the base. Each block carries a cutting tooth detachably mounted thereon. The block carries the cutting tooth at an acute angle to a radial line passing from the axis of the base to the top, front of the block, the cutting tooth angled toward the direction of rotation of the tooth. The tooth has a front cutting section above the mounting block that is bent forwardly from the remainder of the tooth which remainder is fastened to the block. The front cutting section is angled forwardly at a small acute angle above a tangential line leading from the top, front of the block, transverse to the radial line. Thus the tooth on each block is angled slightly forwardly and upwardly so that reaction forces, when the tooth is cutting, are directed, via the block, down into the base partly via compression rather than all by shear. This arrangement strengthens the blocks and allows relatively lighter blocks to be used.

Protective means are provided in front of each mounting block to prevent the blocks from directly striking rocks or large trees during operation of the cutting head. Thus the blocks are not subjected to sudden large forces which could result in serious damage. The protective means preferably comprise rings encircling the cylindrical support base, a ring aligned with each block and of a height at least equal to the height of the block but lower than the height of the cutting section of the tooth on the block.

The teeth employed on the cutting head can be simply made from plate or strap material, shaped to have a relatively long base section and a relatively short cutting section. The cutting section is bent from the base section to extend thereto at an obtuse angle. The cutting section is tapered toward its free end to provide the cutting edge. Cooperating mounting means on the tooth and block securely mount the tooth on the block in a manner preventing its movement relative to the block.

The brush cutting head is mounted on a boom on a brush cutter to have the longitudinal axis of the cylindrical base parallel with the boom. This permits the head to operate in a manner that directs chips and debris in a direction transverse to the brush cutter vehicle, and the operator on the vehicle, thereby minimizing damage and injury.

The invention is particularly directed toward a brush cutting head having a cylindrical, tubular, support base and a plurality of cutting tooth mounting blocks fixedly mounted on the cylindrical outer surface of the base, the blocks extending transverse to the longitudinal axis of the base, each block having a front face. A cutting tooth is detachably mounted on each block. Each cutting tooth is made from a plate-like member having a relatively long base section and a relatively short cutting section bent from the base section. The tooth is mounted on the block with the base section adjacent the front face and with the base section extending outwardly from the base. The cutting section is located above the block and extends forwardly from the base section.

The invention is also directed toward a cutting tooth for a brush cutting head made from a plate having a uniform thickness with an inner surface and an outer surface. The tooth has a straight, relatively long, base section and a straight, relatively short, cutting section. The cutting section is bent from one end of the base section, toward the inner surface, to form an obtuse angle between the inner surface of the base section and the inner surface of the cutting section.

The invention is further directed toward a brush cutter having:

a brush cutting head having a cylindrical, tubular support base; a plurality of cutting tooth mounting blocks fixedly, mounted on the cylindrical outer surface of the base, the blocks extending transverse to the longitudinal axis of the base; a cutting tooth detachably mounted on each block; each cutting tooth made from a plate-like member having a relatively long base section and a relatively short cutting section bent from the base section; the tooth mounted on the block with the base section to have the base section extending outwardly from the base and the cutting section above the block and extending forwardly from the base section;

a narrow holder for the brush cutting head, the holder rotatably mounting the head at the bottom of the holder with the head aligned with the holder, and drive means on the holder for rotating the head;

and a vehicle having a boom, the holder pivotably mounted, at one end, on the end of the boom and aligned with the boom, the holder remaining aligned with the boom when pivoted relative to the boom.

BRIEF DESCRIPTION OF THE DRAWINGS

FIG. 3 is a side view of a cutting tooth mounting block;

FIG. 4 is a front view of the block;

FIG. 5 is a side view of the tooth;

FIG. 6 is a front view of the tooth;

FIG. 7 is an assembled side view of the block and cutting tooth;

FIG. 8 is a front view, in partial section, showing the mounting of the cutting head on a boom;

FIG. 9 is an end view of the cutting head on the boom with the casing removed;

DESCRIPTION OF THE PREFERRED EMBODIMENTS

Figure 1:
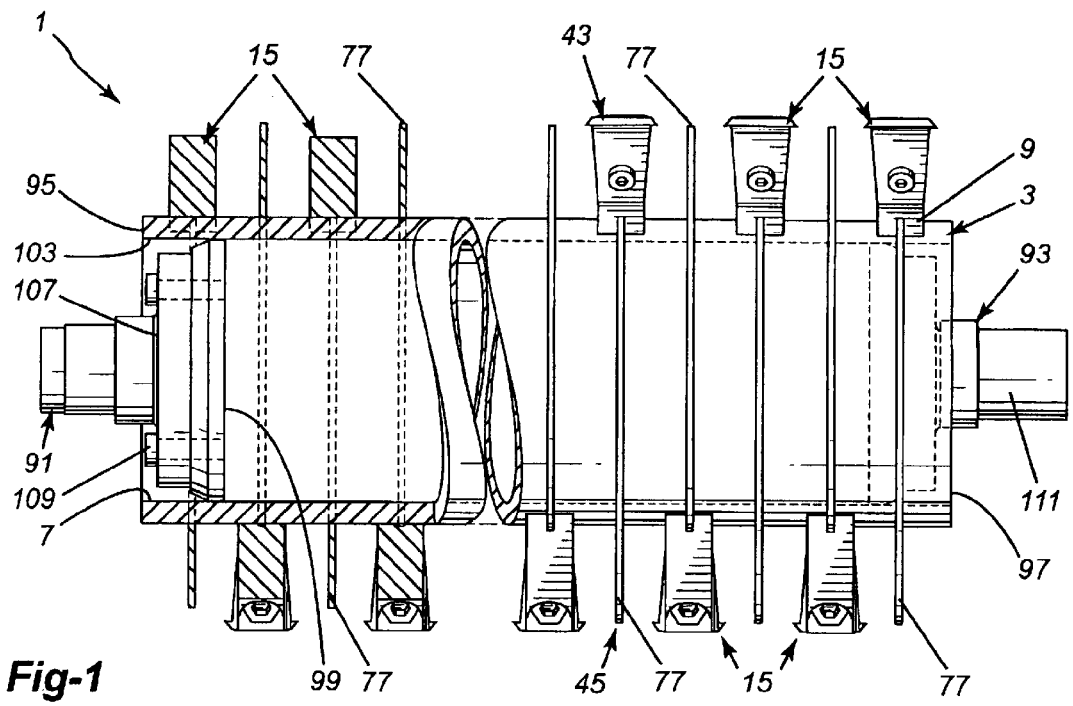
FIG. 1 is a top view, in partial section, of the cutting head.
Figure 2:
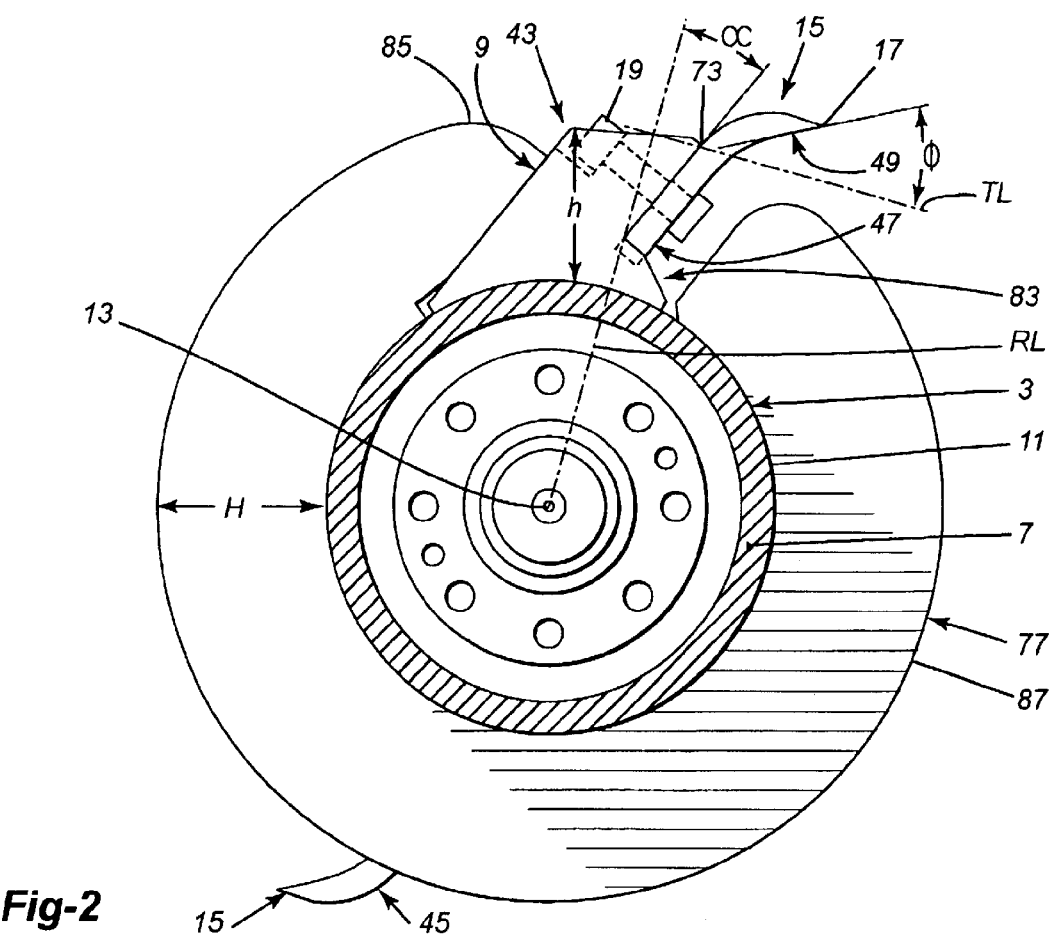
FIG. 2 is a cross-section view taken along line 2—2 in FIG. 1.

The brush cutting head 1 of the present invention, as shown in FIGS. 1 and 2, has a cylindrical support base 3. The base 3 is tubular and is formed from a steel tube having a thick wall 7. A plurality of cutting tooth mounting blocks 9 are fastened to the outer cylindrical surface 11 of the base 3 by welding or other similar means. The blocks 9 are relatively narrow compared to their height or length and the blocks 9 extend in a direction transverse to the longitudinal axis 13 of the base 3. Each block 9 carries a cutting tooth 15, the cutting tooth located at the front of the block and extending outwardly from the base 3 and slightly forwardly. The cutting edge 17 on the outward, leading end of the cutting tooth 15 is located slightly above, and slightly forwardly of the block 9. The tooth 15 is detachably mounted to the block 9 by a bolt 19. The cutting teeth 15 are sized, and located on the base 3 in a manner, to have cutting completely across the length of the base 3 when the base is rotated about its longitudinal axis 13 to have the teeth 15 cut.

In more detail, as shown in FIGS. 3 and 4, each mounting block 9 has an bottom or inner surface 23 concavely curved to match the radius of the base 3. The length of this curved inner surface 23 is relatively short compared to the circumference of the base 3, the length of the inner surface 23 being roughly one-sixth the length of the circumference of the base 3. The block 9 is to be fastened, by welding or other suitable means, with its inner surface 23 flush against the outer surface 11 of the base.

The block 9 has a front mounting surface 25, against which a portion of the tooth 15 is mounted, and a back surface 27. The front and back surfaces 25, 27 are joined by a top surface 29. The front surface 25 extends upwardly, from a forwardly extending step 31, from near the inner surface 23 of the block. The step 31 has a top abutment surface 33 which forms, with the bottom of the front surface 25, an interior corner 35. In accordance with the present invention, the front surface 25 is angled slightly forwardly from a radial line RL of the inner surface 23 which line passes through the interior corner 35. This angle 'α' is about 15° but can range from between 10° and 20°. The abutment surface 33 preferably extends transversely from the front surface 25 making the interior corner 35 a right angle 'β'. The step 31 has a central slot 37 in the abutment surface 33, extending forwardly of the front surface 25, for locating the bottom of a cutting tooth 15 as will be described. The block 9 has parallel side surfaces 39. A fastener hole 41 extends between the front and back surfaces 25, 27, the hole 41 transverse to the front surface 25. The hole 41 passes, in part, through the top surface 29 as well.

The blocks 9 are symmetrically mounted on the base 3. Preferably, the blocks 9 are mounted in two diametrically opposite rows 43, 45 as shown in FIGS. 1 and 2. The blocks 9 in each row are equally spaced apart a distance slightly less than the width of the cutting edge of a cutting tooth and the blocks in row 43 alternate with the blocks in row 45 in a direction parallel to the longitudinal axis 13 of the base.

Each cutting tooth 15 carried by a block 9 is a plate-like member of uniform thickness having a relatively long, straight, base section 47 and a relatively short, cutting section 49 as shown in FIGS. 5 and 6. The cutting section 49 terminates in the cutting edge 17. The cutting section 49 is bent from one end of the base section 47 about a line that is parallel to the cutting edge 17. The cutting section 49 is bent to extend at an obtuse angle 'Ø' to the base section 47. The obtuse angle is about 140° but can range between 120° and 160°. Each cutting tooth 15 has a width 'w' that is at least three times the thickness 't' of the tooth, and a length 'l' that is at least one and a half times the width 'w' of the tooth.

The bottom end 55 of the base section 47 of the tooth 15, joining the front and back surfaces 57, 59 of the tooth, is at right angles to the front and back surfaces 57, 59. The angle 'β' of the exterior corner 61, formed by the front and end surfaces 57, 55, is a right angle, the same as the angle 'β' of the interior corner 35 between the front surface 25 and the abutment surface 33 of the block 9. A projection 63 extends downwardly from the bottom end 55 of the tooth, the projection centrally located on the end 55 and sized to fit snugly within the slot 37 in the step 31 on the block 9.

The front portion of the cutting section 49 of the tooth 15 is tapered to provide the cutting edge 17. Preferably, the front portion of the cutting section 49 is tapered downwardly from the back surface 59 to the front surface 57 to form the cutting edge 17 at the end of the front surface 57. The taper forms an angled leading surface 65 on the front portion of the cutting section 49 and this surface, upwardly and rearwardly directed from the cutting edge 17, deflects objects away from the tooth.

The cutting tooth 15 tapers in width from its widest portion at the cutting edge 17 to its narrowest portion at the bottom free end 55. The taper helps clear chips from the tooth during operation of the cutting head. A threaded, mounting opening 67 extends through the tooth between the front and back surfaces 57, 59, transverse to the base section 47 and located to be aligned with the hole 41 in the block 9 when the tooth 15 is mounted on the block.

The tooth 15 is mounted on the block 9, as shown in FIG. 7, by placing its bottom end 55 on the abutment surface 31 of the block with the back surface 59 of the base section 47 of the tooth resting flush against the front mounting surface 25 of the block and with the projection 63 on the tooth located within the slot 37 on the block. The right-angled exterior corner 61 on the tooth fits snugly into the right-angled interior corner 35 on the block. The slot 37 and projection 63, along with the corners 35, 61, form cooperating connecting means. A fastener, such as a bolt 71, also forming part of the connecting means, is passed through the hole 41 in the block and threaded into the opening 67 in the tooth to securely connect the tooth to the block. The connecting means is designed to prevent movement of the tooth, particularly lateral movement, when mounted on the block.

When the tooth 15 is mounted on the block 9, the base section 47 of the tooth, flush against the front surface 25 of the block, is angled slightly forwardly. The cutting section 49 of the tooth 15, including the cutting edge 17, is located above the top, front corner 73 of the block and projects slightly upwardly and forwardly. If a tangential line TL is drawn from where the radial line RL intersects the top of the block, the cutting section 49 of the tooth 15 is angled slightly upwardly relative to this line. This angle φ is also about 15° but can range between 10° and 20°. Having the base section 47 of the tooth 15 angled forwardly on the block 9 and having the cutting section 49 angled upwardly, instead of extending tangentially, results in a reaction to the cutting forces acting on the block 9, toward the base 3, that is partly in compression. This makes for a stronger block-tooth assembly and can result in a lighter cutting head.

Protective means 75 are provided on the cutting head for protecting each of the mounting blocks 9 on the head 1 as shown in FIGS. 1 and 2. The protective means 75 comprise a protective collar 77 associated with each block, one end 79 of the collar near the front step 31 of the block, the collar 77 extending forwardly therefrom in a circumferential direction about a portion of the base 3. Preferably each collar 77 extends substantially about the base 3, the rear end 81 of the collar terminating adjacent the back surface 27 of the block 9 as shown in FIG. 2. Preferably each collar 77 is centrally aligned with its block 9. The collars 77 are plate-like and are each welded onto the surface 11 of the base 3 to extend radially therefrom, transverse to the longitudinal axis 13 of the base. The rear end 81 of the collar 77 is also welded to the back surface 27 of its associated mounting block 9 to strengthen the block. Each collar 77 has a height 'H' equal to, or slightly greater than, the height 'h' of the block. Each collar 77 terminates circumferentially a short distance from the associated block 9 in front of the block to provide a front clearance space 83. The front clearance space 83 provides space for the chips cut by the cutting tooth 15 mounted on the block 9 to disperse. Welding the rear end 81 of each collar 77 to the back of its associated block 9 also strengthens the block 9. The rear upper corner 85 of each collar can be cut back just enough to provide access to the fastener 19.

The outer, circular, edges 87 of the collars 77, fairly close together, minimize the chance of the blocks 9 striking rocks or large trees as the head 1 is rotated, which, if it happened, could cause serious damage to the head. The cutting section 49 of each tooth 45 is located outwardly past the outer edges 87 of the collars 77 allowing them to cut brush and the like. The cutting section 49 of a tooth 45 could be damaged striking a rock or a large tree but a damaged tooth can be easily replaced in comparison to having to replace a mounting block 9. The clearance space 83 between each collar and its associated block and tooth assembly also helps to balance the weight distribution about the head 1.

The cutting head 1 can have replaceable mounting spindles 91, 93 at each end as shown in FIG. 1. A mounting plate 99 is fastened inside the base 3, adjacent each end 95, 97, to the inner surface 103 of the wall 5. Each mounting spindle 91, 93 is centrally, fixedly, connected to a face plate 107 that in turn is centrally, detachably connected to its respective mounting plate 99 and is bolted to it by bolts 109. The spindles 91, 93 rotatably mount the cutting head 1. One of the spindles 93 has an extension 111 to connect the cutting head 1 to a drive mechanism to rotate it as will be described.

The cutting head 1 is mounted at the bottom of a narrow support 115 as shown in FIGS. 8 and 9. The support 115 includes a main frame 119 having spaced-apart end frames 121, 123 extending down from a top cross-frame 125. The end frames 121, 123 carry bearing mounts 127, 129 near their free ends. The cutting head 1 is rotatably mounted via the mounting spindles 91, 93 in the bearing mounts 127, 129, the head extending between the end frames 121, 123. One of the end frames 121 is hinged near its free end so that the bearing mount 127 that it carries is detachable to facilitate mounting of the cutting head 1. The bottom of the cutting head 1 is about level with the bottom of the support 115 when mounted thereon.

A hydraulic motor 133 is mounted on the main frame 119 above the cutting head 1 and a belt drive 135 connects the output of the motor 133 to the spindle extension 111 on the head to rotate the head to cut brush. A sheet metal casing 137 can enclose the support 115 to protect the bearing mounts, the motor, and the belt drive. The support 115 is adapted to be pivotably mounted, via a pivot connection 139 at one top end 141 of the main frame 121, to the free end 143 of a boom 145 on a transport vehicle (not shown), the support 115, and the cutter head 1, aligned with the boom. The support 115 can be pivoted up and down about its pivot connection 139 to the boom 145 by a hydraulic cylinder 147 connected between the boom 145 and the support 115, as shown by arrow 'A', to change the angle of the cutting head 1 relative to the ground so as to be easily able to cut on slopes. Having the support 115, and the cutting head 1, aligned with the boom 145 directs the chips generated during cutting sideways, away from the vehicle and vehicle operator, providing for safer operation.

Figure 10:
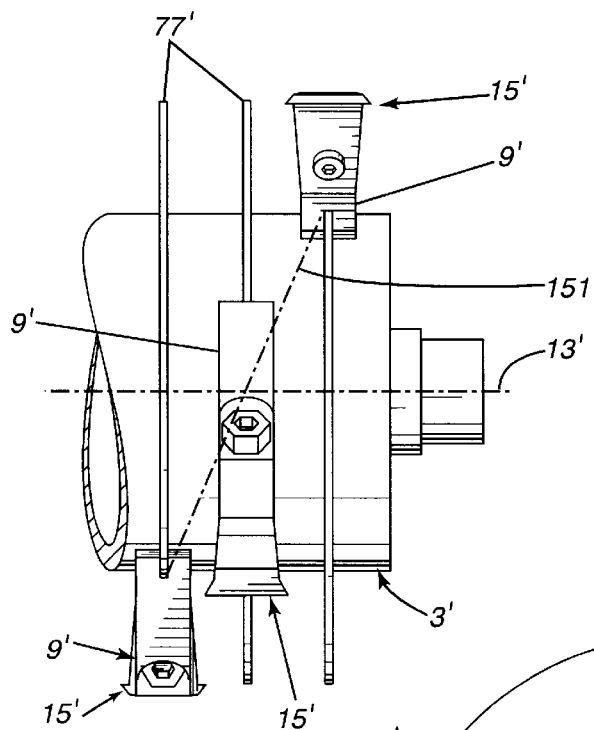
FIG. 10 is a top view of another embodiment of the cutting head of the invention.
Figure 11:
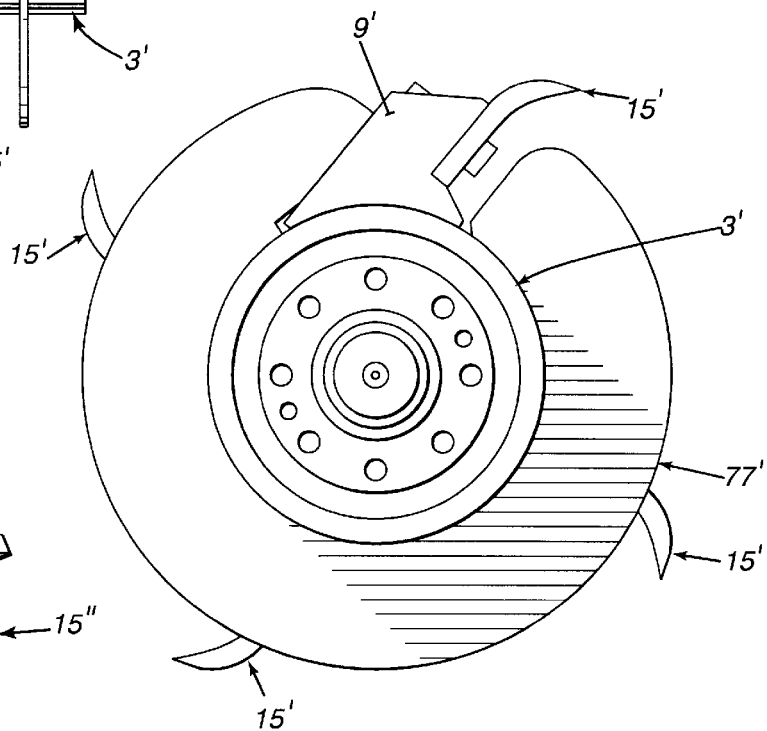
FIG. 11 is an end view of the cutting head shown in FIG. 10.

The cutter head 1 has been shown with the cutting teeth 15 arranged in two diametrically opposed rows along the base 3. The cutting teeth could however also be arranged spirally about the base. As shown in FIGS. 10 and 11, the teeth 15' are mounted on the base 3' along a spiral line 151 that extends from one end of the base to the other. The teeth 15' are mounted on mounting blocks 9' which blocks are still transverse to the longitudinal axis 13' of the base 3'. The spiral angle is chosen to have all the teeth overlap their cuts so as to cut along the entire length of the base. While a single spiral row of cutting teeth 15' has been shown, double spiral rows could also be used. A protective collar 77' can be provided for each mounting block 9', encircling the base 3' and transverse to the longitudinal axis of the base.

Figure 12:
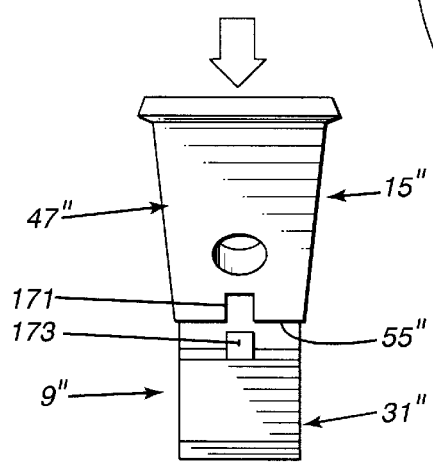
FIG. 12 is another embodiment of the connecting means connecting the cutting tooth to the mounting block.

The cutting teeth have been shown mounted on the mounted blocks with one type of connecting means. Other types of connecting means can be employed. For example, instead of having the slot 37 on the block 9 and the projection 63 on the tooth 15, as shown in FIGS. 4 to 6, these elements could be reversed with the slot on the tooth and the projection on the block. As shown more clearly in FIG. 12, the base section 47" of the tooth 15" can be slotted inwardly from its end 55", the slot 171 tightly fitting about a projection 173 formed on the step 31" of the mounting block 9". Alternatively, in some cases it may be sufficient to dispense with the slot and projection elements on the block and tooth and merely rely on the interengaging interior and exterior corners 35, 61 on the tooth and block respectively, to form part of the connecting means.

The interior corner 35 on the block 9 has been shown as a right angle β. The corner 35 could also be an obtuse angle provided that the front surface 25 of the block 9 remains angled forwardly at the angle α. An obtuse-angled corner 35 is obtained by modifying the step 31 to change the angle made between the abutment surface 33 on the step and the front face 25 on the block to an obtuse angle.

The preferred embodiment of the invention has the base sections 47 of the cutting teeth 15 angled forwardly when mounted on the support blocks 9, and has the cutting sections above the blocks and extending forwardly and slightly upwardly. The teeth 15 could however be mounted on the blocks 9 to have their base sections 47 extend radially from the base 3, provided the cutting sections 49 still extend forwardly and slightly upwardly. This arrangement would still provide a small compressive component of reaction force to the cutting forces on the blocks. Alternatively, with the base sections 47 of the teeth angled forwardly, the cutting sections 49, still above the blocks, could extend tangentially. This arrangement would also still provide a small compressive component of reaction force to the cutting forces on the block.

Figure 13:
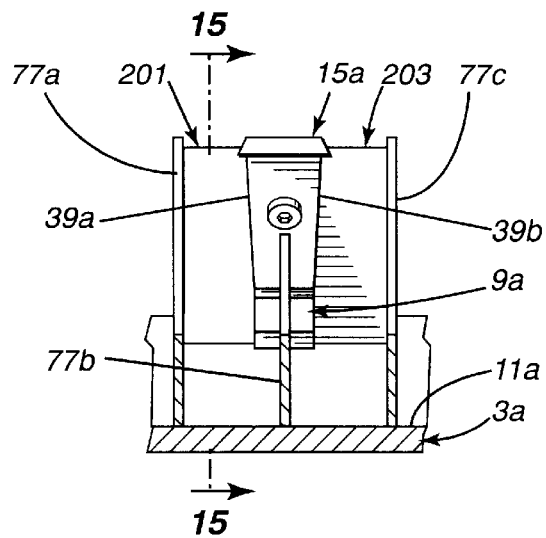
FIG. 13 is a detail front view of a block located between ribs with chip deflector plates.
Figure 14:
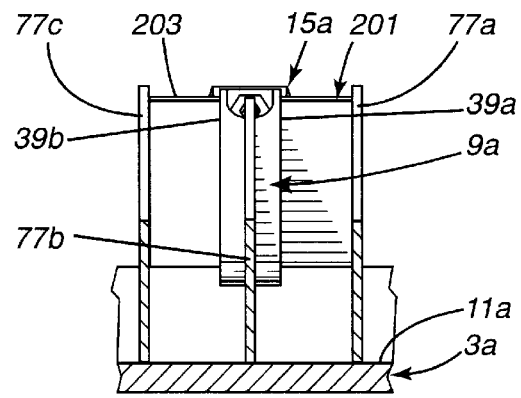
FIG. 14 is a detail rear view of the block shown in FIG. 13.
Figure 15:
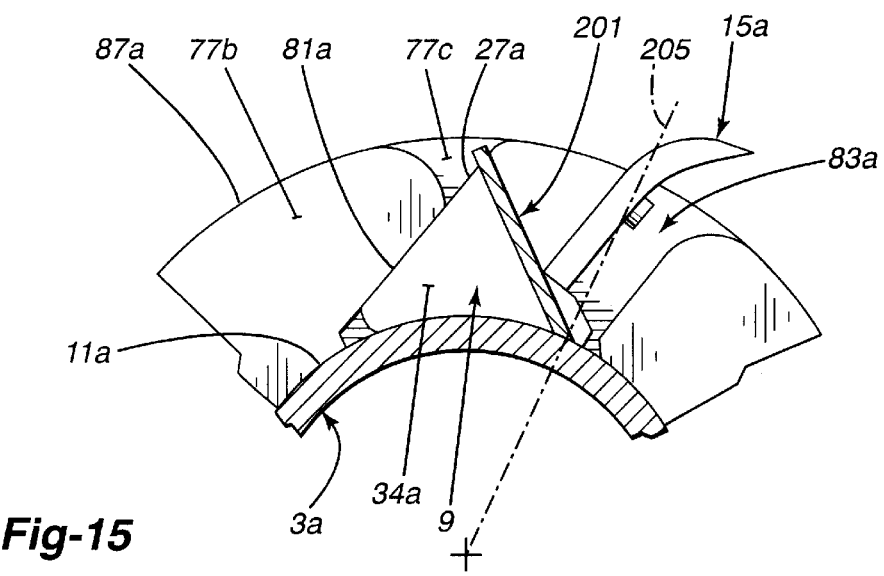
FIG. 15 is detail cross-section view taken along line 15—15 in FIG. 13

The cutter head can be modified to provide deflectors for deflecting the chips cut by the teeth outwardly away from the head so that the chips are not hit, and projected as small missiles, by other teeth on the cutter head as it rotates. As shown in FIGS. 13 to 15, each mounting block 9a on the cutter head could be provided with a plate-like deflector 201, 203, one on each side 39a, 39b of the block. Each deflector 201, 203 is welded to its respective side 39a, 39b of the block 9a and extends transversely therefrom. Each deflector 201, 203 can also be welded to the outer surface 11a of the base 3a and is angled upwardly and rearwardly from the bottom, front face of the block 9a to deflect chips cut by the tooth 15a on the block radially outwardly away from the carrier head.

The deflector plates 201, 203 can extend toward, but not touch the protective collars 77a, 77c facing the sides 39a, 39b respectively of the block 9a. Preferably however, the deflector 201 on one side 39a of the block, extends fully between the side 39a of the block and the adjacent protective collar 77a while deflector 203, on the other side 39b of the block extends fully between the side 39b of the block 9a and the protective collar 77c adjacent the side 39b. Each deflector 201, 203 is welded not only to a side of the block, and to the surface of the base 3a, but also to the protective collar facing that side.

The deflectors 201, 203 are each preferably angled rearwardly about 45 degrees from a radial line 205 passing from the center of the base 3a through where the deflectors contact the base. The deflectors 210, 203 do not interfere with the collar 77b associated with the block 9a, the collar 77b still spaced from the block 9a at its front end to form a clearance space 83a for the chips and fastened at its rear end 81a to the back 27a of the block 9a. Also, the deflector plates 201, 203 do not extend above the outer edge 87 of the collars. Not only do the deflectors on each block deflect the chips formed by the tooth 15a carried by the block 9a outwardly away from other teeth on the head, making the working environment safer, they also strengthen the mounting blocks making it more difficult to dislodge them.

We claim:

1. A brush cutting head having a cylindrical, tubular, support base; a plurality of cutting tooth mounting blocks fixedly mounted on the cylindrical outer surface of the base, the blocks extending transverse to the longitudinal axis of the base, each block having a straight front face, and sides; a cutting tooth detachably mounted on each block, each cutting tooth made from a plate-like member having a relatively long, straight, base section and a relatively short cutting section bent from the base section; the tooth mounted on the block with the base section of the tooth adjacent the front face of the block and the base section extending outwardly from the base, and with the cutting section above the block and extending forwardly from the base section of the tooth.

2. A cutting head as claimed in claim 1 wherein the base section of the tooth, when mounted on the block, is angled slightly forwardly relative to a radial line that extends from the axis of the base and intersects the bottom of the front surface of the block.

3. A cutting head as claimed in claim 2 wherein the cutting section extends slightly upwardly from a tangential line extending from where the radial line intersects the top of the block.

4. A cutting head as claimed in claim 3 including a protector on the base for each block, the protector extending radially from the surface of the base and aligned with its block, the protector extending far enough radially outwardly to prevent the block, but not the cutting section of the tooth on the block, from striking an object.

5. A cutting head as claimed in claim 4 including a deflector plate on each side of the block, behind the tooth, for deflecting chips outwardly away from the tooth; each plate fastened to its side of the block and a protective collar facing that side.

6. A cutting head as claimed in claim 4 wherein the protector is in the form of a narrow collar that extends substantially circumferentially about the surface of the base, transverse to the longitudinal axis of the base, the collar terminating a short distance in front of the block to provide a clearance space in front of the block, and the cutting tooth on the block, for the chips produced by the tooth.

7. A cutting head a claimed in claim 6 wherein the collar is connected to the back of the block to strengthen the structure.

8. A cutting head as claimed in claim 4 wherein the block has a front mounting surface extending rearwardly at a slight angle to the radial line, and an abutment surface at no greater than a right angle to the front mounting surface at the bottom of the front mounting surface and extending forwardly from the front mounting surface, the base section of the tooth fitting flush against both the front mounting surface and abutment surface when the tooth is mounted on the block.

9. A cutting head as claimed in claim 3 wherein the block has a front mounting surface extending rearwardly at a slight angle to the radial line, and an abutment surface at no greater than a right angle to the front mounting surface at the bottom of the front mounting surface and extending forwardly from the front mounting surface, the base section of the tooth fitting flush against both the front mounting surface and abutment surface when the tooth is mounted on the block.

10. A cutting head as claimed in claim 3 including a deflector plate on each side of the block, behind the tooth, for deflecting chips outwardly away from the tooth.

11. A cutting head as claimed in claim 3 wherein the cutting section is bent to extend from the base section at an inside obtuse angle ranging between 120° and 160°.

12. A cutting head as claimed in claim 1 including a protector on the base for each block, the protector extending radially from the surface of the base and aligned with its block, the protector extending far enough radially outwardly to prevent the block, but not the cutting section of the tooth on the block, from striking an object.

13. A cutting head as claimed in claim 12 wherein the protector is in the form of a narrow collar that extends substantially circumferentially about the surface of the base, transverse to the longitudinal axis of the base, the collar terminating a short distance in front of the block to provide a clearance space in front of the block, and the cutting tooth on the block, for the chips produced by the tooth.

14. A cutting head as claimed in claim 13 including a deflector plate on each side of the block, behind the tooth, for deflecting chips outwardly away from the tooth; each plate fastens to its side of the block and a protective collar facing that side.

15. A cutting head a claimed in claim 13 wherein the collar is connected to the back of the block to strengthen the structure.

16. A cutting head as claimed in claim 1 wherein one set of blocks are mounted along one line on the surface of the base which line is parallel to the longitudinal axis of the base, the one set of blocks equally spaced apart, and a second set of blocks are mounted along a second line, diametrically opposed to the one line and parallel to the axis of the base, the second set of blocks equally spaced apart; the blocks in one set located between the blocks in the second set in a direction parallel to the longitudinal axis of the body.

17. A cutting head as claimed in claim 1 including connecting means for detachably connecting the tooth to the block in a manner preventing lateral movement of the tooth relative to the block, the connecting means including a fastener for connecting the tooth to the block with the base section of the tooth flush against the front face of the block.

18. A cutting head as claimed in claim 17 wherein the connecting means includes a slot on one of the tooth and the block and a projection on the other of the tooth and block for entering the slot to lock the tooth against lateral movement relative to the block.

19. A cutting head as claimed in claim 1 including a deflector plate on each side of the block, behind the tooth, for deflecting chips outwardly away from the tooth.

20. A brush cutting head having a cylindrical, tubular, base; a plurality of cutting tooth mounting blocks fixedly mounted on the outer cylindrical surface of the base; a cutting tooth detachably mounted on each block, each tooth having a cutting edge, the cutting edge located radially outwardly past the block; and a protective guard associated with each block, the guard mounted on the cylindrical surface of the base in front of the block and extending forwardly from the block in a circumferential direction about a portion of the base; each guard projecting radially outwardly from the surface a distance at least equal to the height of the block but less than the height of the cutting edge from the surface, the guard preventing the block from being struck by an object while allowing the tooth to cut when the cutting head is rotated to cut brush.

21. A cutting head as claimed in claim 20 wherein the protector is in the form of a narrow, broken, ring that extends substantially circumferentially about the surface of the base, transverse to the longitudinal axis of the base, the protector terminating a short distance in front of the block to provide a clearance space in front of the block, and the cutting tooth on the block, for the chips produced by the tooth.

22. A cutting head a claimed in claim 21 wherein the protector is connected to the back of the block to strengthen the structure.

23. A cutting tooth for a brush cutting head made from a plate having a uniform thickness with an inner surface and an outer surface; the tooth having a straight, relatively long, base section and a straight, relatively short, cutting section; the cutting section bent from one end of the base section, toward the inner surface, to form an obtuse angle between the inner surface of the base section and the inner surface of the cutting section, the obtuse angle ranging from between 120° and 160°.

24. A tooth as claimed in claim 23 wherein the free end of the cutting section is angled back from the inner surface of the cutting section to the outer surface to form a cutting edge at the inner surface.

25. A tooth as claimed in claim 23 wherein the free end of the base section is angled back from the outer surface to the inner surface in a manner to form an exterior, acute, corner between the tree end and the cuter surface.

26. A brush cutter having:

a brush cutting head having a cylindrical, tubular, support base; a plurality of cutting tooth mounting blocks fixedly mounted on the cylindrical outer surface of the base, the blocks extending transverse to the longitudinal axis of the base and each block having a front surface; a cutting tooth detachably mounted on each block; each cutting tooth made from a plate-like member having a relatively long base section and a relatively short cutting section bent from the base section; the tooth mounted on the block with the base section flush against the front face to have the base section extending outwardly from the base and the cutting section above the block and extending forwardly from the base section;

a narrow holder for the brush cutting head, the holder rotatably mounting the head at the bottom of the holder with the head aligned with the holder, and drive means on the holder for rotating the head;

and a vehicle having a boom, the holder pivotably mounted, at one end, on the end of the boom and aligned with the boom, the holder remaining aligned with the boom when pivoted relative to the boom.

* * * * *